United States Patent [19]

Stauffer

[11] Patent Number: 4,501,961
[45] Date of Patent: Feb. 26, 1985

[54] VISION ILLUMINATION SYSTEM FOR RANGE FINDER

[75] Inventor: Norman L. Stauffer, Englewood, Colo.

[73] Assignee: Honeywell Inc., Minneapolis, Minn.

[21] Appl. No.: 413,946

[22] Filed: Sep. 1, 1982

[51] Int. Cl.³ .............................................. G01J 1/20
[52] U.S. Cl. .................................. 250/201; 250/204; 250/560; 901/47
[58] Field of Search .................. 250/201 R, 204, 553, 250/560; 356/4, 381, 384; 901/47

[56] References Cited

U.S. PATENT DOCUMENTS

| 3,443,502 | 5/1969 | Harvey | 354/403 |
|---|---|---|---|
| 4,065,778 | 12/1977 | Harvey | 354/403 |
| 4,185,191 | 1/1980 | Stauffer | 250/204 |
| 4,240,726 | 12/1980 | Wick | 354/405 |
| 4,317,991 | 3/1982 | Stauffer | 250/201 |
| 4,375,921 | 3/1983 | Morander | 356/381 |
| 4,410,804 | 10/1983 | Stauffer | 250/578 |

FOREIGN PATENT DOCUMENTS 58-30614  2/1983  Japan ........................ 356/4

*Primary Examiner*—David C. Nelms
*Assistant Examiner*—James Gatto
*Attorney, Agent, or Firm*—Charles J. Ungemach

[57] ABSTRACT

Apparatus for illuminating a remote object first with uniform intensity and second with a pattern so the detector array may view the object to determine its characteristics and view the pattern to determine the range to the object.

15 Claims, 2 Drawing Figures

F I G. 1
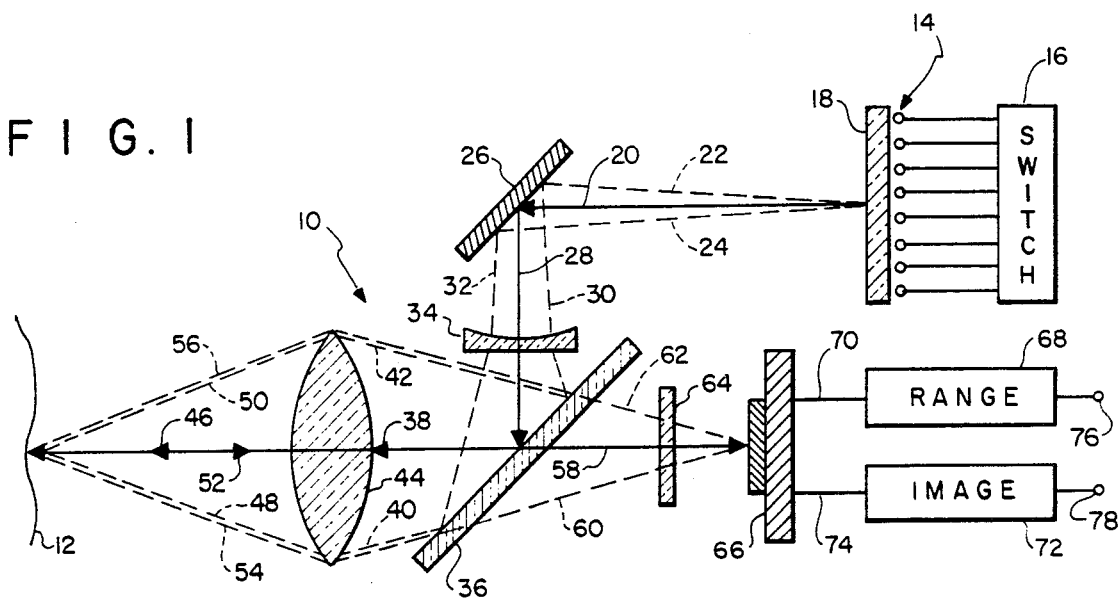
F I G. 2
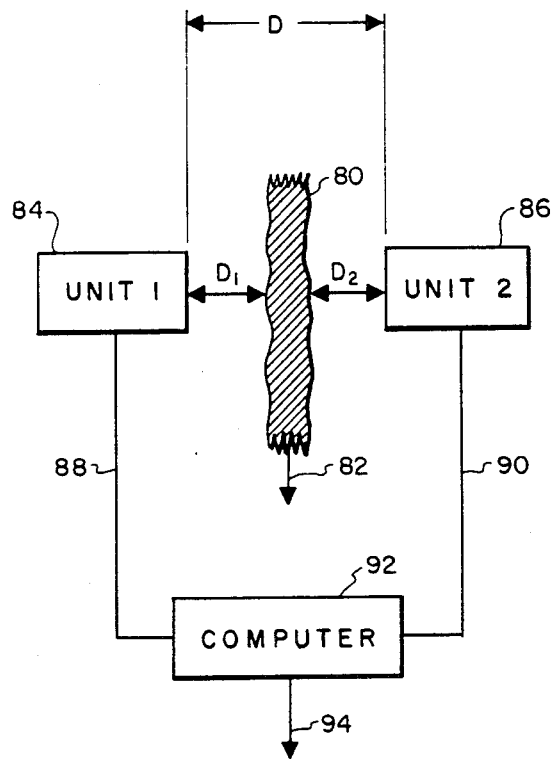

VISION ILLUMINATION SYSTEM FOR RANGE FINDER

BACKGROUND OF THE INVENTION

In my U.S. Pat. No. 4,185,191, issued Jan. 22, 1980 entitled "Range Determination System" assigned to the Assignee of the present invention, I disclosed an invention for use in autofocus cameras, to determine the range to a remote object by the use of pairs of detectors mounted in a row behind a corresponding row of small lenslets which receive light from the remote object through the taking lens of the camera. Each of the detector pairs receives an image of the exit pupil of the taking lens, and if the object is in proper focus, the amount of radiation received by each detector in the pair will be approximately the same. If the object is not in focus, then the amount of radiation received by the detectors will not be the same, and by analyzing the outputs of the individual detectors in each pair, a pair of curves may be generated, the relative displacement of which is indicative of the range to the object which information may be used to, for example, automatically focus a camera.

In my co-pending application Ser. No. 282,379, filed July 13, 1981, entitled "Two Dimensional Image Panel With Range Measurement Capability," now U.S. Pat. No. 4,410,804, issued Oct. 18, 1983 and assigned to the assignee of the present invention, I disclosed an apparatus which uses the detectors of the above-mentioned patent 4,185,191 in connection with an array that can enable the user to determine not only the range to an object but also simple pattern recognition to identify the object. Such apparatus is intended for use, for example, on industrial robots to measure the distance to an object, and determine its identity so as to move a robot arm in a controlled manner.

The system of the above-mentioned U.S. Pat. No. 4,185,191 requires that there be a certain amount of subject contrast in order to perform accurate distance measurement. There are, however, situations where it is desirable to detect and measure rather featureless objects or surfaces which do not have sufficient contrast. Accordingly, the passive system of the abovementioned U.S. Pat. No. 4,185,191 is not able to accurately determine the distance to the object and the camera or the robot arm cannot be controlled in the desired manner.

In the art of range determination there are, however, "active" systems which do not require object contrast. One such system is shown in my U.S. Pat. No. 4,317,991, issued Mar. 2, 1982, entitled "Digital Autofocus System Utilizing a Photodetector Array" and assigned to the Assignee of the present invention. In this "active" autofocus system, a beam of modulated energy is projected towards the object and the energy reflected therefrom is directed through special optics to a special detector array. By determining the position of the reflected energy on the detector array, the distance to the object is obtained. Many other "active" systems are known, some of which utilize sonic energy and time the travel of a pulse from the source to the object and back as a measure of distance and some of which utilize light energy in the visible or infrared regions with various detection arrangements to provide a distance measurement by triangulation. Such systems do not depend on object contrast for their range determining abilities. When using "active" systems, however, the features of the object cannot be determined and accordingly, such systems cannot be used for object recognization. None of the prior art systems either active or passive can be used for recognition of an object and also for range determination of a low contrast or featureless surface with the same set of detector elements.

SUMMARY OF THE INVENTION

The present invention allows the detectors to provide a first output indicative of the character of the object and a second output indicative of the range to the object even when the object is featureless. This is accomplished by combining features of an "active" with a "passive" system. The invention is an "active" system by virtue of having a plurality of light emitting elements which, when activated in a first mode, uniformly illuminates the remote object so that its shape or character can be determined in a passive manner for object recognition, and in a second mode, illuminate the object with a predetermined pattern to supply subject contrast which the detector array passively observes to determine the object's range. Features of the present invention includes the use of an array of lamps or light emitting diodes as one possible source of illumination with all or most of them being energized to uniformly illustrate the object and with predetermined ones being energized to produce the desired pattern on the object, so that it is consistent with the size of the detector array, a diffuser in front of the light emitting elements to help produce uniform illumination for character recognition and yet allow the definite patter to be projected when selected ones are turned on for range determination and a filter in front of the detector array to attenuate wavelengths other than those originating from the lamps or LED's. The present invention can also be employed to measure the thickness of a still or moving object such as a web by positioning a system as described herein on both sides of the web with the outputs thereof sent to a synchronized interface module and to a microcomputer to calculate the thickness thereof. In the prior art, there are only very expensive sensors used to monitor thickness.

BRIEF DESCRIPTION OF THE INVENTION

FIG. 1 is a schematic representation of the preferred embodiment of the present invention; and FIG. 2 is a schematic representation of two systems employed for measuring the thickness of a moving web.

DETAILED DESCRIPTION OF THE PREFERRED EMBODIMENT

In FIG. 1, a range and characture determining system 10 is shown operable to detect the character of and the range to a remote object 12, which may have a substantially featureless surface.

In System 10, a plurality of lamps or LED's 14, are shown to be connected to and actuated by a switch 16, so one or more of the LED's 14 produces light which is transmitted through a diffuser 18 and passes along a path shown generally by arrow 20 and dash lines 22 and 24, to a mirror 26 where the path is bent downwardly as is shown by the arrow line 28 and dotted lines 30 and 32, through a negative lens 34, and to a partially silvered mirror 36. A portion of the light is shown reflected from mirror 36 to the left along a path shown by arrow 38 and dashed lines 40 and 42, through a lens 44 which may be the taking lens of a camera or the major lens of a range determining system and then along a path shown by arrow 46 and dash lines 48 and 50 to the object 12. Energy reflected from the surface 12 passes back along a path shown by arrow 52 and dash lines 54 and 56, again through the lens 44 and through the partially reflecting mirror 36 along a path shown by arrow 58 and dash lines 60 and 62, and through a filter 64 to a detector array 66 which may be like that shown in the above referenced copending application Ser. No. 282,379. As explained therein, the detector array produces signals which may be presented to a range determination system 68, along a path shown by reference numeral 70 and to an image microprocessor 72, along a path shown by reference numeral 74, so as to provide a signal containing range information as, for example, as shown by output 76 and also a signal containing character information as, for example, as shown by output 78 and thus, together, determine what object 12 is and where it is located.

In order to determine the features of object 12, it is desirable for object 12 to be substantially uniformly illuminated and accordingly, switch 16 may be operated so that all of the lamps or LED's 14 are illuminated at the same time, so that light passing through diffuser 18 and the path above described, will uniformly light the surface of object 12, enabling the character recognition portion of the system to determine the nature of the object. When the surface 12 is substantially featureless then, in order to determine its range, switch 16 may be operated so that only one or several predetermined ones of the lamps or LED's 14 are illuminated thus producing on the surface 12 a pattern which can be detected by the detector array 66 to produce range information in the passive way the system works with objects having satisfactory contrast.

Since the detector array 66 is of rather small dimensions, the image of the pattern projected by the LED array 14 onto the object 12 may be larger than the detector array 66 can accomodate. Accordingly, the negative lens 34 is placed in the path so that the image on detector array 66 is of the proper size. The filter 64 operates to filter out unwanted wavelengths and allow the detector 66 to determine the range to object 12 utilizing only the pattern produced by lamps or LED's 14.

It should be noted that the system of FIG. 1 provides that the active system for illuminating the surface 12 be projected through the same lens 44 as the reflected energy passes through on its way to detector 66. This prevents the parallax problem that may occur in prior art systems when the projected beam travels to the object along a path which is at an angle to the path of the reflected beam. Such systems can only determine range over a fairly limited distance to be measured. In the system of FIG. 1, this problem is overcome by partly silvered mirror 36 and accurate indication of range as is obtained for the industrial robots.

FIG. 2 shows how two systems of the kind shown in FIG. 1 may be utilized to determine the thickness of an object as, for example, a traveling web. In FIG. 2, a web of material 80 is shown to be moving downwardly in the direction shown by arrow 82. A first unit 84, which may be such a unit as is shown in FIG. 1, is mounted on the left side of web 80 and is utilized to determine the distance D1 from the left side of web 80 to the unit 84. A second unit 86, which also may be a system such as is shown in FIG. 1, is mounted on the other side of web 80, and is utilized to determine the distance D2 between the right side of web 80 and the unit 86. The distance between units 84 and 86 is shown as a predetermined known distance D and the range outputs from units 84 and 86 are shown being presented along paths shown by reference numerals 88 and 90 to a computer 92 which operates to subtract the distance D1 and D2 information from units 84 and 86 from the known distance D so as to produce an output shown by arrow 94 indicative of the thickness of web 80.

It is therefore seen that I have provided an improved range determination system which can be used to determine the character of and the distance to, a relatively featureless surface and a novel use for such apparatus in determining the thickness of a moving web. Many alterations and modifications will occur to those skilled in the art, and I do not intend to be limited to the specific disclosure used in connection with the preferred embodiment.

I intend only to be limited by the following claims.

I claim:

1. Apparatus for use with a system which includes a detector array operable to produce a first signal containing information indicative of the characteristics of a remote object and to produce a second signal containing information indicative of the range to the remote object comprising:

radiation emitting means operable in a first condition to transmit radiation to the remote object so as to substantially uniformly illuminate the remote object, the remote object reflecting at least a portion of the radiation to the detector array for use thereby in producing the first signal and in a second condition to transmit radiation to the remote object so as to provide a non-uniform pattern of illumination on the remote object, the remote object reflecting at least a portion of the radiation to the detector array for use thereby in producing a second signal.

2. Apparatus according to claim 1, further including a first lens and wherein the radiation transmitted to the remote object is through the first lens and the radiation reflected from the remote object to the array is through the first lens.

3. Apparatus according to claim 1, wherein said radiation emitting means comprises a group of radiation sources each energizable to produce radiation and further means operable to energize a first plurality of sources in the group to produce the first condition and to energize at least one of the sources to produce the second condition.

4. Apparatus according to claim 3, further including radiation diffusing means mounted between said radiation sources and the remote object.

5. Apparatus according to claim 3, further including a negative lens between the radiation sources and the remote object so that the size of the predetermined pattern is appropriate to the size of the detector array.

6. Apparatus according to claim 1 further including filter means mounted between the remote object and the array to filter radiation other than that produced by the radiation emitting means.

7. Apparatus according to claim 3, wherein the group of radiation sources are light emitting diodes.

8. Apparatus according to claim 1 further including another apparatus according to claim 1 and means mounting the two apparatuses a predetermined distance apart on opposite sides of a path operable to contain a moving member, the second signal from each of the apparatuses being presented to computing means which subtracts the sum of the second signals from a third signal representative of the predetermined distance to provide an output signal indicative of the width of the moving member.

9. Apparatus for use with character recognition and range finding equipment which comprises an array of radiation sensitive detectors positioned to receive radiation along a first path from a remote object and operable to produce a first output containing information relative to the character of the remote object and a second output containing information relative to the range to the remote object comprising:

radiation emitting means having first and second conditions, in the first condition said emitting means transmits radiation to the remote object so that the radiation from the remote object to the detector array may be used to produce the first output and, in the second condition, said emitting means transmits radiation so as to illuminate the remote object in a non-uniform pattern so that the radiation from the remote object to the detector array may be used to produce the second output; and control means connected to said emitting means and operable to change said emitting means from the first condition to the second condition.

10. Apparatus according to claim 9, wherein said emitting means transmits radiation to the remote object at least partly along the first path.

11. Apparatus according to claim 9 wherein said emitting means comprises a plurality of individual radiation emitters a first group of which when energized, produce the substantially uniform illumination and a second group of which when energized, produce the non-uniform pattern and wherein said control means operates to energize the first and second groups.

12. Apparatus according to claim 11, further including diffusing means mounted between the said emitting means and the object to at least partially diffuse the radiation emitted by the radiation emitters.

13. Apparatus according to claim 11, further including a negative lens mounted between said emitting means the remote object to make the size of the pattern transmitted by the second group of emitters consistent with the size of said detector array.

14. Apparatus according to claim 9 further including filter means mounted in the first path to filter radiation other than that produced by said emitting means.

15. First and second apparatuses according to claim 9, mounted a predetermined distance apart on opposite sides of a path adapted to contain a moving object and computer means connected to receive the second outputs of the first and second apparatuses and to subtract the sum of the range to opposite sides of the moving object from the predetermined distance to produce an output signal containing information relative to the thickness of the moving object.

* * * * *